Nov. 5, 1929.         H. S. JANDUS         1,734,488
                      BUMPER CLAMP
            Filed March 25, 1929      2 Sheets-Sheet 1
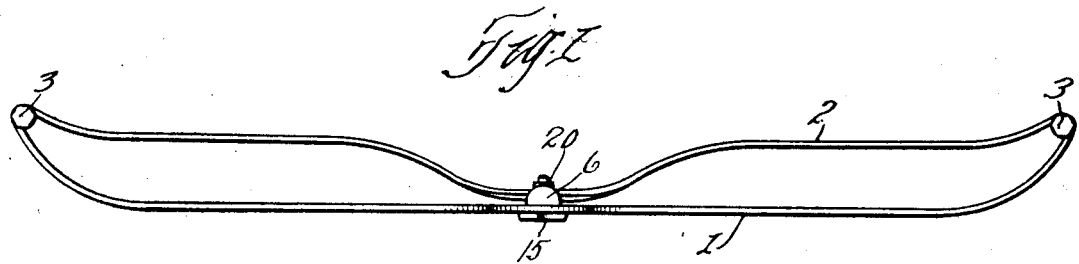
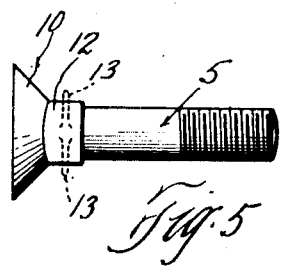 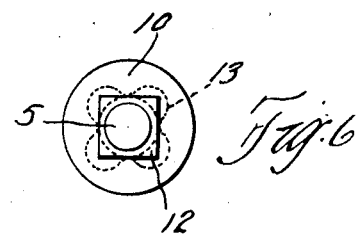
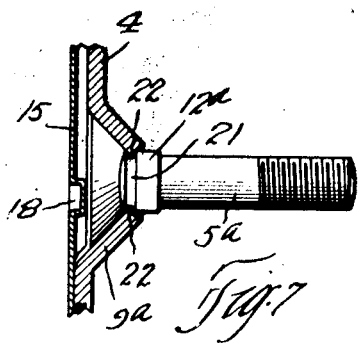 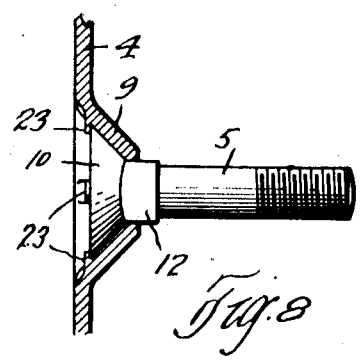
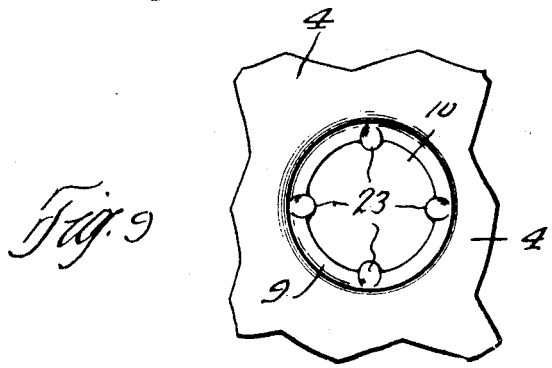
INVENTOR
Herbert S. Jandus
BY
Hull, Brock and West ATTORNEYS Nov. 5, 1929.  H. S. JANDUS  1,734,488
BUMPER CLAMP
Filed March 25, 1929   2 Sheets-Sheet 2
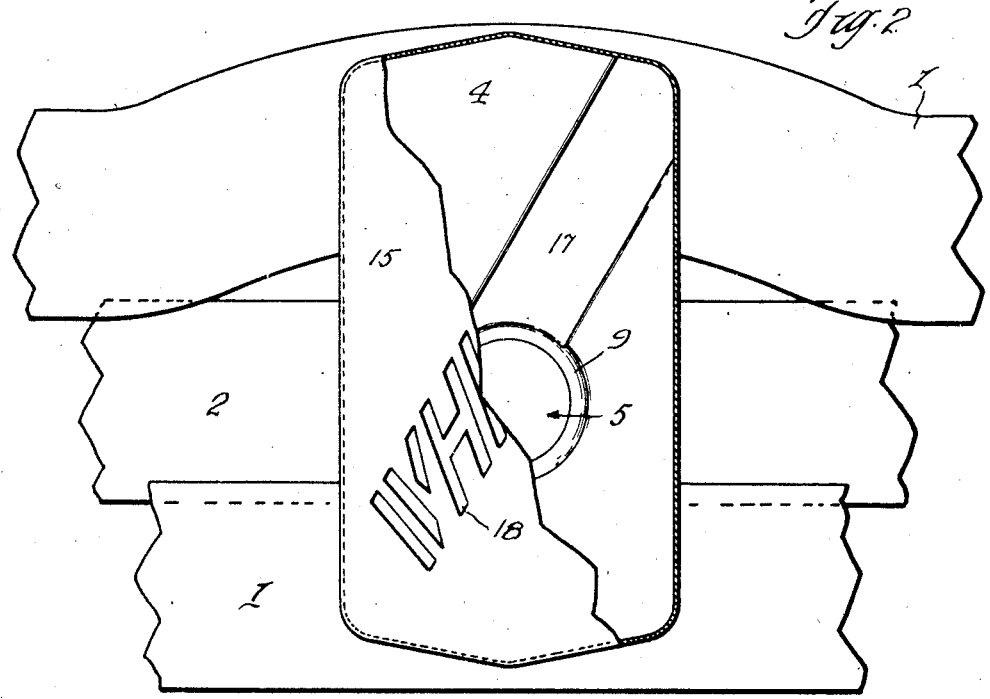
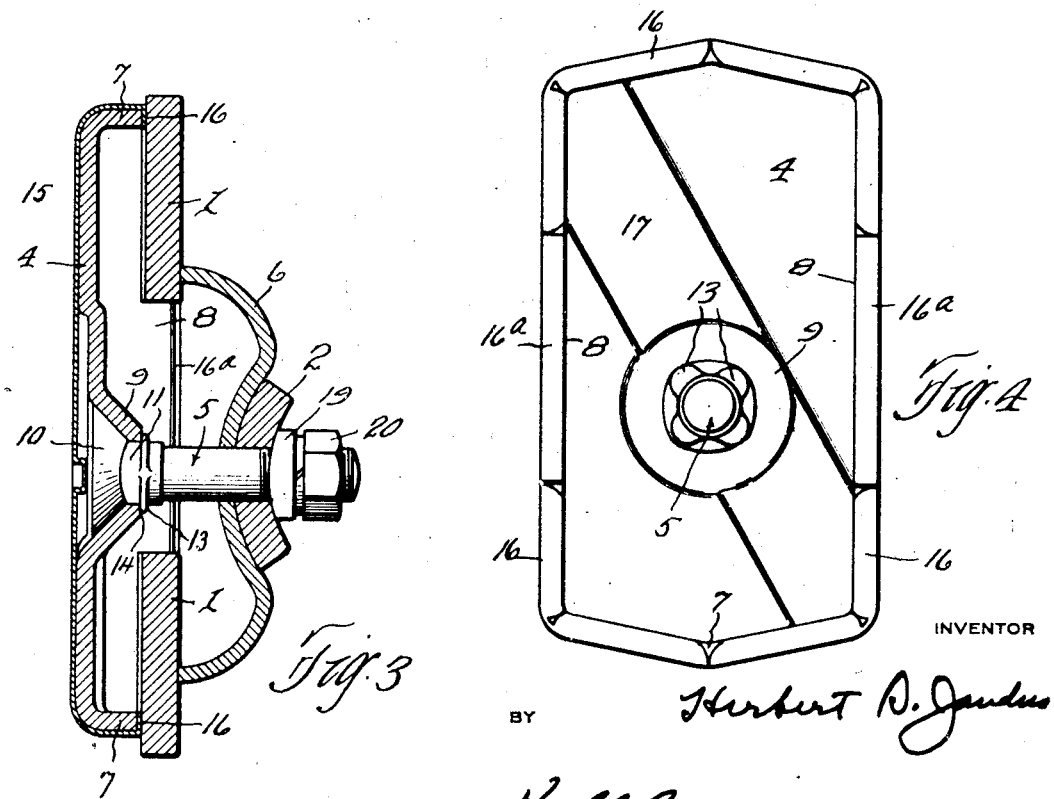
INVENTOR
Herbert S. Jandus
BY
Hull, Brock and West
ATTORNEYS Patented Nov. 5, 1929

1,734,488

UNITED STATES PATENT OFFICE

HERBERT S. JANDUS, OF DETROIT, MICHIGAN, ASSIGNOR TO GENERAL SPRING BUMPER CORPORATION, OF DETROIT, MICHIGAN, A CORPORATION OF MICHIGAN

BUMPER CLAMP

Application filed March 25, 1929. Serial No. 349,544.

This invention relates to clamps for vehicle bumpers and more particularly to a clamp plate adapted to hold the bars in proper spaced relation.

An object of the invention is to provide a clamp plate which can be economically produced and which will be sufficiently substantial to withstand the shocks to which it may be subjected in use. Another object is to provide a clamp plate which may be readily applied to the bars of a vehicle bumper. A further object is to provide a clamp plate to which the bolt is fixedly connected so as to prevent rotation thereof upon the application of the nut thereto. A further object is to provide a clamp plate of sufficient rigidity and of attractive ornamental appearance.

Further and more or less limited objects will be apparent from the following description and drawings and the use of the articles defined in the claims.

In describing the invention, reference will be had to the drawings in which Fig. 1 shows a plan view of a bumper to which the clamp plate is attached; Fig. 2 shows a fractional front elevation of the bumper shown in Fig. 1 with a portion of the sheath cut away from the front of the clamp plate; Fig. 3 shows a section through the bumper along the longitudinal center line of the clamp plate; Fig. 4 shows a rear view of the clamp plate removed from the bumper bars; Fig. 5 shows a side elevation of the clamping bolt with the dotted line showing the position of the metal when the bolt is fixed to the clamp plate; Fig. 6 shows a plan view of the bolt shown in Fig. 5; Fig. 7 shows a detail sectional view through the center line of a clamp plate using a modification of the invention; Fig. 8 shows a similar view of a further modified form of the invention with the ornamental cover plate removed; Fig. 9 is a fractional front elevation of the modification shown in Fig. 8.

In describing the invention the impact section of the bumper will be considered the front thereof, and the terms "front" and "rear" will be used in reference to this arrangement. It is not intended, however, to thereby limit the use of the invention to any particular position on the bumper.

Of the several reference numerals denoting like parts upon the several figures, 1, 1 indicate the impact bars of a vehicle bumper which may be of the general type shown in United States Patent No. 1,372,154, issued to Allan McGregor on March 22, 1921, having a forwardly arched rear bar 2 connected at its ends to and between the ends of the impact bars 1, 1 by means of bolts 3 passing through eyes in the ends of the bars and being arched forwardly in its central portion for connection to the impact section.

The clamp means used for connecting the front and rear bars at their central portions includes a stamped, or otherwise formed, clamp plate 4 to which is fixed a bolt 5 adapted to pass between the bars 1, 1 and through apertures in a bearing plate 6 and the forwardly arched portion of the rear bar 2.

The clamp plate 4 has its peripheral edges bent rearwardly at 7 to form a bearing surface adapted to exert a pressure upon the front surfaces of the spaced bars 1, 1. The portions 8 of the rearwardly extending edges 7 opposite the space between the impact bars 1, 1 are extended to bear upon the adjacent edges of the impact bars and to space the impact bars apart.

The front surface of the plate 4 has a conical depression 9 of such shape as to receive the conical head 10 of the bolt 5. This depressed portion is formed with a square aperture at 11 adapted to fit the square shoulder 12 of the bolt 5 and thereby prevent turning of the bolt. It is apparent that other suitable cooperating configurations may be used to accomplish this result. In assembling the bolt and clamp plate the shank of the bolt is passed through the aperture 11 to such a position that the conical head of the bolt fits snugly within the depressed conical portion 9 of the plate 4. The head of the bolt 5 is then placed upon a solid foundation and a punch having a diameter slightly larger than the shank of the bolt 5 is used to press the metal of the square shoulder 12 down to the position indicated at 13 to form a shoulder 13 adapted to bear upon the flattened surface 14 at the end of the depression 9. By this operation the metal at the corners of the square shoulder 12 will be forced outwardly and take a position approximately as indicated at 13 in Figs. 4 and 6. The shoulder 13 will then prevent the removal of the bolt 5 from the depression 9, and the square shoulder 12 within the aperture 11 will prevent turning of the bolt therein.

The surface of the clamp plate may be covered by an ornamental sheath 15 having its edges turned over the edges 7 of the plate 4, as indicated at 16, 16 to form bearing surfaces between the edges of the plate 4 and the front surfaces of the impact bars 1, 1. These edges may also be turned over the edges of the portions 3, 8 as indicated at 16a, 16a. If it is desired to produce an ornamental depressed design or to indicate a name upon the front of the sheath 15, a depression 17 may be made in the front surface of the plate 4, suitably positioned and dimensioned to provide space for the indentation of the design or letters in the sheath 15 as indicated at 18. It is apparent that these depressions and indentations may be arranged to produce any desired appearance upon the finished clamp.

When the bolt 5 has been fixed in the clamp plate 4 and the sheath 15 has been clamped around the edges thereof, the clamp plate 4 may be applied to the front surfaces of the impact bars so that the projecting portions 8 will pass between and space apart the bars 1, 1. The bearing plate 6 may be inserted between the rear surfaces of the impact bars 1, 1 and the front surface of the rear bar 2. The plate or washer 19 may then be slipped over the shank of the bolt 5 so that it will bear upon the rear surface of the rear bar 2. By tightening the nut 20 on the bolt 5 the clamp plate 4 will be forced against the impact bars 1, 1 and retain the ornamental sheath 15 by gripping the clamped portions 16, 16 thereof. By this means the front and rear bars will be drawn together against opposite surfaces of the bearing plate 6.

In the modification shown in Fig. 7, the bolt 5a has depressions 21, 21 extending around the square shoulder 12a. To retain this bolt in position within the conical depression 9a of the clamp plate 4, the squared edges 22, 22 of the conical depression are forced into the seats in the squared shoulder formed by the depressions 21, 21. The ornamental plate 15 may be applied as described in connection with the modification shown in Figs. 1 to 6. The bolt 5a is held by means of the edges 22, 22 within depressions 21, 21 so that it will be retained within the conical depression 9a.

In the modification shown in Figs. 8 and 9 the conical depression 9 is formed just as in Fig. 3 and the square shoulder of the bolt 5 is prevented from turning by means of the square aperture 11 in such conical depressed portion. The bolt 5 is positioned so that its conical head 10 is within the conical depression 9 and the metal of the plate 4 above the head of the bolt 5 is punched to form the nibs 23, 23 extending out over, and bearing upon, the head of the bolt 5. By this means the head of the bolt 5 will be retained within the depression 9. It is apparent that the metal may be punched and turned over all around the head of the bolt 5 to form a continuous projection rather than the separated nibs 23, 23.

Either of the modifications described may be assembled as described in connection with the form shown in Figs. 1 to 6 and will function similarly upon being so assembled.

It is apparent that other modifications of the invention may be utilized and it is not intended to hereby limit the scope of the invention to the particular embodiments herein shown. It is further apparent that the invention may be used with other types of clamps and with other types of bumper connections than those specifically referred to.

Having thus described my invention, what I claim is:

1. The combination with a clamp plate having an aperture therein, of a bolt having a shoulder positioned in said aperture, said bolt having the metal of said shoulder crushed down to extend over the edge of said aperture.

2. The combination with a clamp plate having an aperture therein, of a bolt having a shoulder positioned in said aperture and shaped to cooperate therewith to prevent rotation of said bolt, said bolt having the metal of the shoulder punched to expand over the edges of said aperture.

3. The combination with a clamp plate having a depression and an aperture in said depression, of a bolt having a head positioned in said depression and a shoulder in said aperture, said bolt having the metal of its shoulder displaced to force it over the edge of said aperture and thereby retain the bolt in contact with the clamp plate.

4. The combination with a clamp plate having a depression and an aperture in said depression, of a bolt having a head positioned in said depression and a shoulder positioned in said aperture, said shoulder being shaped to cooperate with said aperture to prevent rotation of the bolt, said bolt having the metal of its shoulder displaced to force it over the edge of said aperture and thereby prevent removal of the bolt.

5. The combination with a clamp plate having its edges bent rearwardly to bear upon the surface to be clamped and having a depression in its surface with an aperture therein, of a bolt having a head adapted to fit within said depression and having a shoulder within said aperture, said bolt having the metal of its shoulder turned over to project over the edges of said aperture.

6. The combination of a clamp plate having rearwardly extending edges adapted to bear upon the surface to be clamped and having a depression adapted to receive the head of a bolt and an aperture in said depression, of a bolt having its head within said depression and having its shoulder positioned in said aperture, and interengaging means between such depression and the said bolt for preventing removal of said bolt from said clamp plate.

7. The combination of a clamp plate having rearwardly extending edges adapted to bear upon the surface to be clamped and having a depression shaped to receive the head of a bolt and an aperture in said depression, of a bolt having its head in said depression and its shoulder in said aperture, said shoulder being shaped to cooperate with said aperture in preventing rotation of the bolt, and means for retaining the head of the said bolt within said depression.

8. The combination, with a pair of spaced impact bars, of a clamp plate having rearwardly bent edges adapted to extend between said spaced bars, said plate having a depression for the head of a bolt and an aperture in said depression, a bolt having its head seated within said depression and its shoulder within said aperture, and means integral with said bolt for preventing the removal thereof from said clamp plate.

9. The combination with a pair of spaced impact bars, of a plate having its edges bent rearwardly to extend between and space apart said impact bars, said plate having a depression to receive the head of a bolt and an aperture in said depression, a bolt passing through said aperture and having its head seated in said depression, means for preventing removal of said bolt from said seat, and a sheath extending across the face of said clamp and bent over the edges thereof to positions between said clamp plate and the bars to be clamped.

10. A clamp plate having a depressed portion adapted to receive the head of a bolt and having an aperture therein, a bolt passing through said aperture and having its head seated in said depression, means for preventing removal of said bolt from said depression and an ornamental sheath extending across the face of said plate and clamped to the periphery thereof, said plate having a depression across its surface and said sheath having ornamentation indented therein and adapted to extend into said depressed portion.

In testimony whereof, I hereunto affix my signature.

HERBERT S. JANDUS.